Feb. 1, 1944.    K. KOSCHMIEDER    2,340,539
TESTING TRANSMITTER
Filed July 5, 1941

INVENTOR.
KURT KOSCHMIEDER
BY
*J. L. Hearing*
ATTORNEY

Patented Feb. 1, 1944

2,340,539

UNITED STATES PATENT OFFICE 2,340,539

TESTING TRANSMITTER

Kurt Koschmieder, Berlin, Germany; vested in the Alien Property Custodian

Application July 5, 1941, Serial No. 401,099
In Germany July 8, 1940

4 Claims. (Cl. 250—17)

For testing direction finding receivers and the like a small measuring transmitter has to be erected on the test floor. This transmitter is arranged to radiate a nearly constant field intensity in order to provide for testing the compensation of site error and for ascertaining the direction finding properties of the receiver. For this purpose it has been necessary continually to supervise the frequency and field intensity of such test transmitter because supply lines from the receiver to the transmitter are not permissible. The frequency of the transmitter must be changed in accordance with instructions called to an attendant.

A test transmitter as provided by the present invention does not require any manipulation other than erecting and energizing it and then nevertheless radiates a constant field intensity for the fundamental frequency and harmonics thereof.

To such an end an amplifying tube is used and the anode current thereof is distorted by being made to be saw-tooth-shaped. In order to achieve this distortion, the control frequency of the testing transmitter is conveyed to the amplifying tube at an amplitude which is sufficiently great, while also the grid condenser and the grid leak resistance of such amplifying tube are properly calculated, or adjusted in well known manner, so that with a certain anode loading resistance there will be effective at the antenna condenser the fundamental wave and harmonics which are the more numerous the steeper the descending flanks of the saw teeth. The amplitude of the harmonics decreases when the ordinal thereof increases. Contrary to this phenomenon the radiation of a short bar-shaped antenna increases with the frequency increasing in its turn. Therefore, according to other features of the invention the amplitude, which decreases when the ordinal of the harmonics increases, is so balanced or compensated by properly tuning the antenna, that the antenna shall radiate a constant amplitude for the fundamental wave and a number of harmonics, thus radiating a constant field intensity for the fundamental and harmonics thereof. That is, when the antenna is energized by the saw-tooth-shaped waves, there is produced a complex radiated wave having a fundamental component and a number of harmonic components, each of which components has substantially the same intensity or amplitude.

Figure 1:
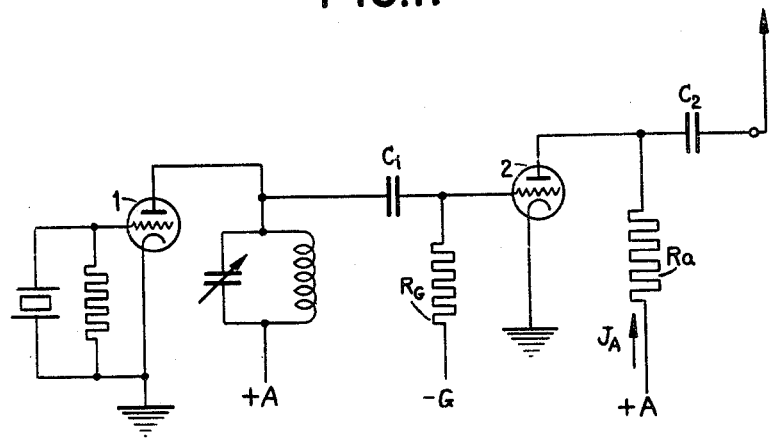
Figure 2:
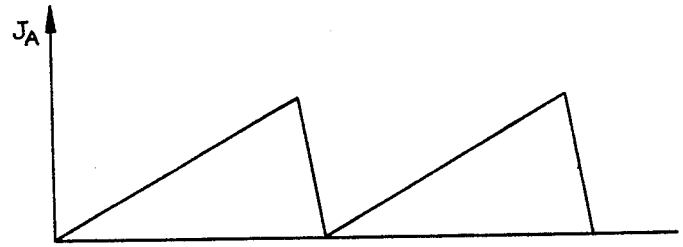

In the drawing, Fig. 1 is a diagrammatic view showing one embodiment of the invention, Fig. 2 is a graph of the anode current of tube 2, Fig. 1.

The arrangement illustrated in Fig. 1 is the customary control transmitter which also may be variable. 1 denotes the oscillatory tube, 2 the amplifying tube, $R_G$ the grid leak resistance, $C_1$ the grid condenser for tube 2. According to the invention, $R_G$ and $C_1$ are so chosen that the anode current $J_A$ of tube 2 is a complex wave of saw-tooth-shape, as illustrated in Fig. 2. This anode current has the fundamental frequency of the control transmitter. With a certain anode resistance $R_a$, there are effective at the antenna condenser $C_2$ the fundamental wave and harmonics which are the more numerous the steeper the descending flanks of the saw teeth represented in Fig. 2.

If the antenna be $\lambda/4 = 2.5$ m. long, $\lambda$ being the wavelength, then its radiation characteristic is such that the best efficiency of radiation is obtained in the case of $\lambda = 10$ m. Furthermore, if the fundamental frequency of the control transmitter be 1 mHz., that is, one million cycles per second, which will be seen to be lower than that at which the antenna has its best radiation efficiency, it will be possible to insure a fairly constant field intensity of the test transmitter within a range that includes the 25th harmonic. That is, the antenna when excited by the complex wave of saw-tooth-shape, radiates its energy directly as a complex radiated wave containing a fundamental component and a number of harmonic components, each of which components has substantially the same amplitude. The transmitter thus operates within the entire necessary frequency range, say from 100 m. down to 10 m., at a field intensity which is constant for distances of 100 kHz., 500 kHz. or 1000 kHz.

No attendance to such test transmitter is necessary during operation.

Transmitters of this kind are intended especially for testing the reception of short waves.

What is claimed is:

1. A testing transmitter which comprises means to produce a control frequency, an electronic amplifying tube having a grid condenser and a grid leak resistance, this tube being connected to receive the said control frequency, and an antenna connected to an anode circuit of the amplifying tube, said condenser and resistance being adjusted to cause the production of saw-tooth-shaped waves in said anode circuit when large amplitude waves of said control frequency are applied to the grid of the tube, the radiation characteristic of said antenna being most efficient at a frequency above said control frequency.

2. A transmitter according to claim 1 in which said antenna constitutes tuned means to radiate a complex wave in response to energization of the antenna by said saw-tooth-shaped wave, said radiated complex wave including a component of fundamental frequency and a number of components of different harmonic frequency, each of which components of different frequency is of substantially the same amplitude.

3. The method of transmitting waves which includes distorting a wave of fundamental frequency to produce a complex wave including a component of said fundamental frequency and components of harmonic frequency, said harmonics having amplitudes which decrease with the ordinal of the harmonic, and directly radiating energy from said complex wave as radiated energy by radiating said components of harmonic frequency at different respective efficiencies inversely proportional to said amplitudes, thereby producing radiated components which are of substantially the same amplitude.

4. The method as set forth in claim 3, in which the wave distortion includes the production of a saw tooth wave.

KURT KOSCHMIEDER.